(No Model.)
P. W. CORCORAN.
WEED CUTTER ATTACHMENT FOR CULTIVATORS.
No. 602,430. Patented Apr. 19, 1898.
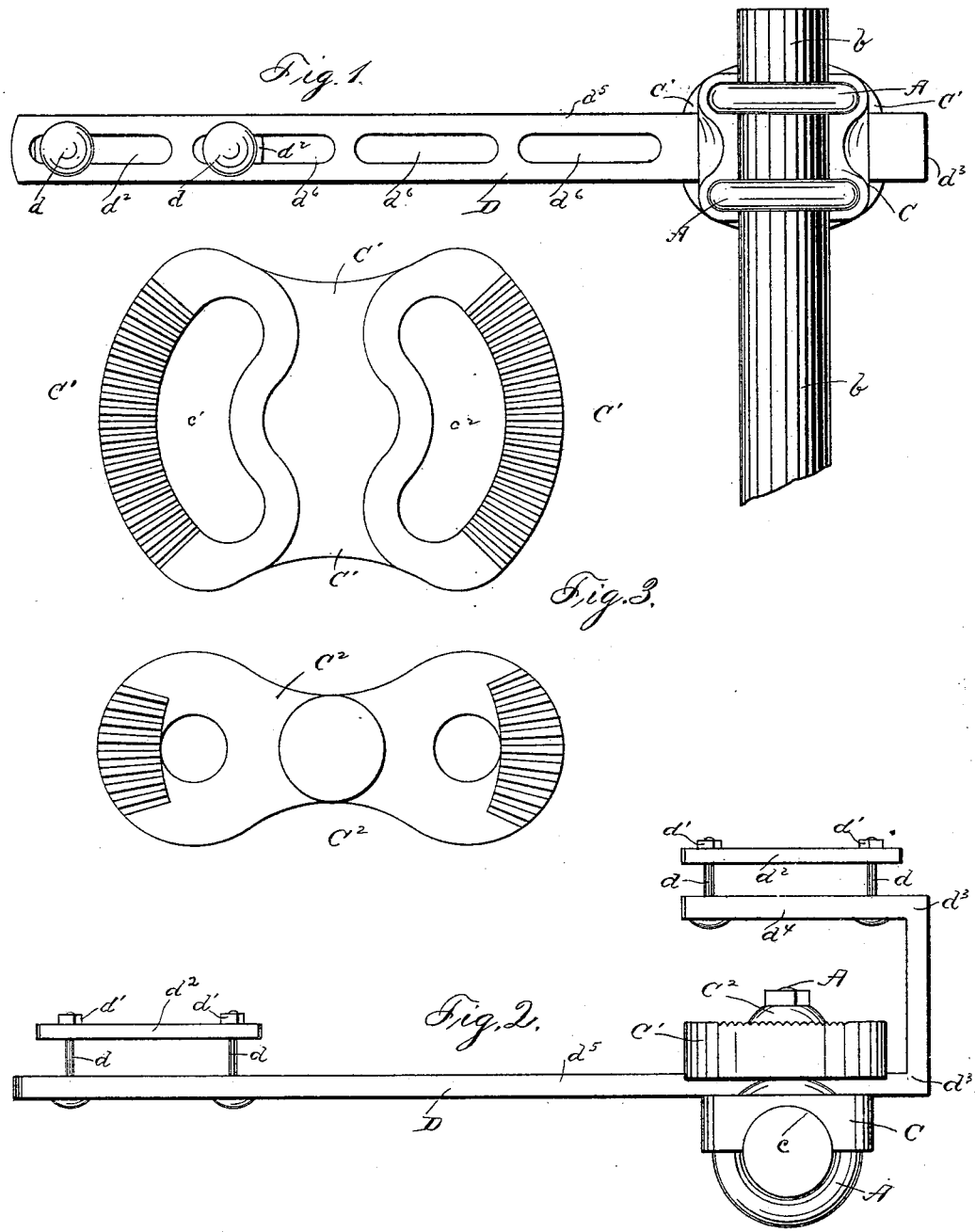
WITNESSES:
Otis D. Swett.
C. M. McMillan.
INVENTOR
Patrick W. Corcoran.
BY
Thomas P. Simpson
ATTORNEY.

UNITED STATES PATENT OFFICE.

PATRICK W. CORCORAN, OF FOREST, ILLINOIS.

WEED-CUTTER ATTACHMENT FOR CULTIVATORS.

SPECIFICATION forming part of Letters Patent No. 602,430, dated April 19, 1898.

Application filed June 22, 1897. Serial No. 641,754. (No model.)

*To all whom it may concern:*

Be it known that I, PATRICK W. CORCORAN, a citizen of the United States, residing at Forest, in the county of Livingston and State of Illinois, have invented certain new and useful Improvements in Weed-Cutter Attachments for Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to cutter attachments for cultivators, and has for its special object to facilitate the use of the weed-cutter described in my United States Patent No. 545,945, granted to me on the 10th of September, 1895.

The invention will be first described in connection with the drawings and then pointed out in the claim.

Figure 1 of the drawings is a rear elevation showing my invention applied; and Fig. 2, a plan view of the attachment-frame, showing its exact form. Fig. 3 is a detail view of the clamps by which the cutter is secured to the frame.

In the drawings, A A represent loop-bolts to hold the shank $b$ of the weed-cutter in the cavity $c$ of the clamp C, while the clamp C' and washer $C^2$ are correspondingly notched, so as to lock rigidly together. They also have arc slots $c'$ $c^2$, so that they may be adjusted on the bolt.

D is the bar to which the shanks of the cultivator-shovels are attached by the bolts, nuts, and washers $d$ $d'$ $d^2$. The cultivator-shovels are in pairs, one pair working on each side of a row of plants and the two of a pair being not parallel, but one behind the other. Hence I make two right angles $d^3$ $d^3$ in the bar, so as to have two parallel arms $d^4$ $d^5$, while the long arm $d^5$ is made with the slots $d^6$ to permit of the adjustment to suit the particular distance apart at which the shovels may be placed at different times and for various purposes.

It will be readily perceived that the cutter and its attachments to secure it to the plow-standards do not interfere with any part of the cultivator, while the cultivator-plows may be removed from their standards and the weed-cutter used alone.

What I claim as new, and desire to protect by Letters Patent, is—

A weed-cutter attachment for cultivators having the bar D with right angles $d^3$ $d^3$, parallel arms $d^4$ $d^5$ and the slots $d^6$ in the arm $d^5$ whereby it may be clamped to two standards of the cultivator and to the weed-cutter shank in the manner shown and described.

In testimony whereof I affix my signature in presence of two witnesses.

PATRICK W. CORCORAN.

Witnesses:
   J. E. CARMON,
   R. E. MORTON.